Figure 1:
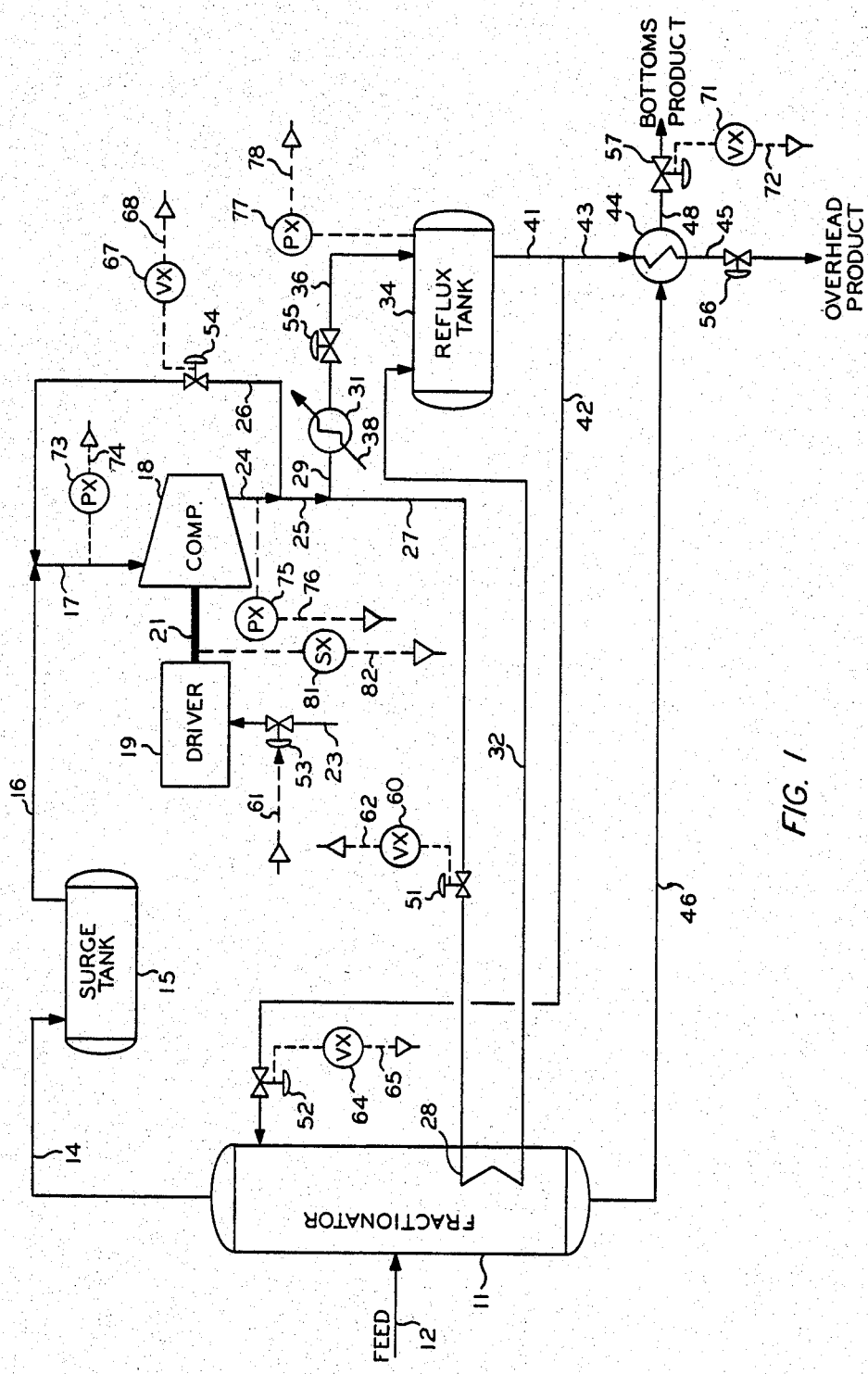

United States Patent [19]

Funk

[11] Patent Number: 4,530,738

[45] Date of Patent: Jul. 23, 1985

[54] CONSTRAINT CONTROL OF A FRACTIONAL DISTILLATION PROCESS

[75] Inventor: Gary L. Funk, Bartlesville, Okla.

[73] Assignee: Phillips Petroleum Company, Bartlesville, Okla.

[21] Appl. No.: 430,625

[22] Filed: Sep. 30, 1982

Related U.S. Application Data

[62] Division of Ser. No. 309,333, Oct. 6, 1981, Pat. No. 4,392,877.

[51] Int. Cl.$^3$ ............................................. B01D 3/42
[52] U.S. Cl. ................................ 203/2; 203/DIG. 18; 208/DIG. 1
[58] Field of Search ............... 364/501; 203/DIG. 18, 203/1, 2, 18, 24, 26; 202/160; 196/132; 208/DIG. 1; 62/21, 37, 26, 30

[56] References Cited

U.S. PATENT DOCUMENTS 3,225,551 12/1965 Kelly ..................................... 62/21

Primary Examiner—Frank Sever
Attorney, Agent, or Firm—French and Doescher

[57] ABSTRACT

In a fractional distillation process in which a compressor is used to supply heat to the fractional distillation process, a plurality of signals representative of a plurality of speeds of the compressor, required to prevent various process constraints from being violated or maintain various desired process oprating conditions respectively, are compared. The signal representative of the highest compressor speed is utilized to control the compressor. In this manner, the compressor is run at the minimum speed required to satisfy the various process constraints and maintain the desired process operating conditions.

7 Claims, 2 Drawing Figures

CONSTRAINT CONTROL OF A FRACTIONAL DISTILLATION PROCESS

This application is a division of application Ser. No. 309,333 filed Oct. 6, 1981 now U.S. Pat. No. 4,392,877.

This invention relates to a control of a fractional distillation process in which a compressor is used to supply heat to the fractional distillation process. In one aspect this invention relates to method and apparatus for controlling the speed of such a compressor so as to substantially minimize the energy required to drive the compressor while insuring that desired operating conditions are matintained and process constraints are not violated.

Fractional distillation processes in which a compressor is utilized to supply heat to the process are typically referred to as heat pump fractionators. Deisobutanizers and deisopropanizers may fall into the classifcation of heat pump fractionation. In general, the overhead stream from the fractional distillation column is supplied to the suction inlet of the compressor. The overhead stream is compressed and provided from the discharge outlet of the compressor to the fractional distillation column reboiler. After passing through the reboiler, the compressed overhead stream is generally provided to a reflux tank and at least a portion of the liquid in the reflux tank will be provided to the fractional distillation column as an external reflux.

The compressor speed must be high enough to insure that a number of operating conditions and process constraints are satisfied. The compressor must supply sufficient energy to pump the compressed overhead stream through the reboiler to the reflux tank and must also provide a sufficient flow of the compressed overhead stream to insure that sufficient heat is supplied to the fractional distillation column to accomplish the desired separation. Also, the discharge pressure must be such that the product streams can be provided to downstream units and a discharge pressure must be high enough to maintain a controlled reflux flow to the fractionator. Also, the speed of the compressor must be high enough to avoid limitations imposed by the compressor construction and also avoid surging of the compressor.

Typically, the above constraints are satisfied by setting the compressor at a constant speed high enough to satisfy all of the above listed operating conditions and constraints and other operating conditions and constraints which may exist in a particular fractional distillation process. Valves are utilized to reduce particular flows so as to maintain desired operating conditions while the compressor continues to run at a constant speed. However, this may result in substantial energy losses if the compressor is running at a speed higher than that actually necessary to satisfy the process operating conditions constraints. Since the viability of a particular fractional distillation process may well be determined by the energy economics of that process, it is extremely desirable to operate the compressor at the lowest speed which will provide a safe margin of controllability for the process and satify the various operating conditions and constraints associated with the process.

It is thus an object of this invention to provide method and apparatus for controlling the speed of a compressor which is utilized to supply heat to a fractional distillation process so as to substantially minimize the energy required to drive the compressor while insuring that desired operating conditions are maintained and process constraints are not violated.

In accordance with the present application, method and apparatus is provided whereby a plurality of signals representative of a plurality of speeds of a compressor; required to prevent various process constraints from being violated or maintain various desired process operating conditions respectively, are compared and the signal representative of the highest compressor speed is utilized to control the compressor. In this manner, the compressor is run at the minimum speed required to satisfy the various process constraints and maintain the desired process operating conditions. Operation at this minimum speed results in a significant minimization of energy requirements for operation of the compressor while insuring that a desired operation of the fractional distillation process is maintained.

Figure 2:
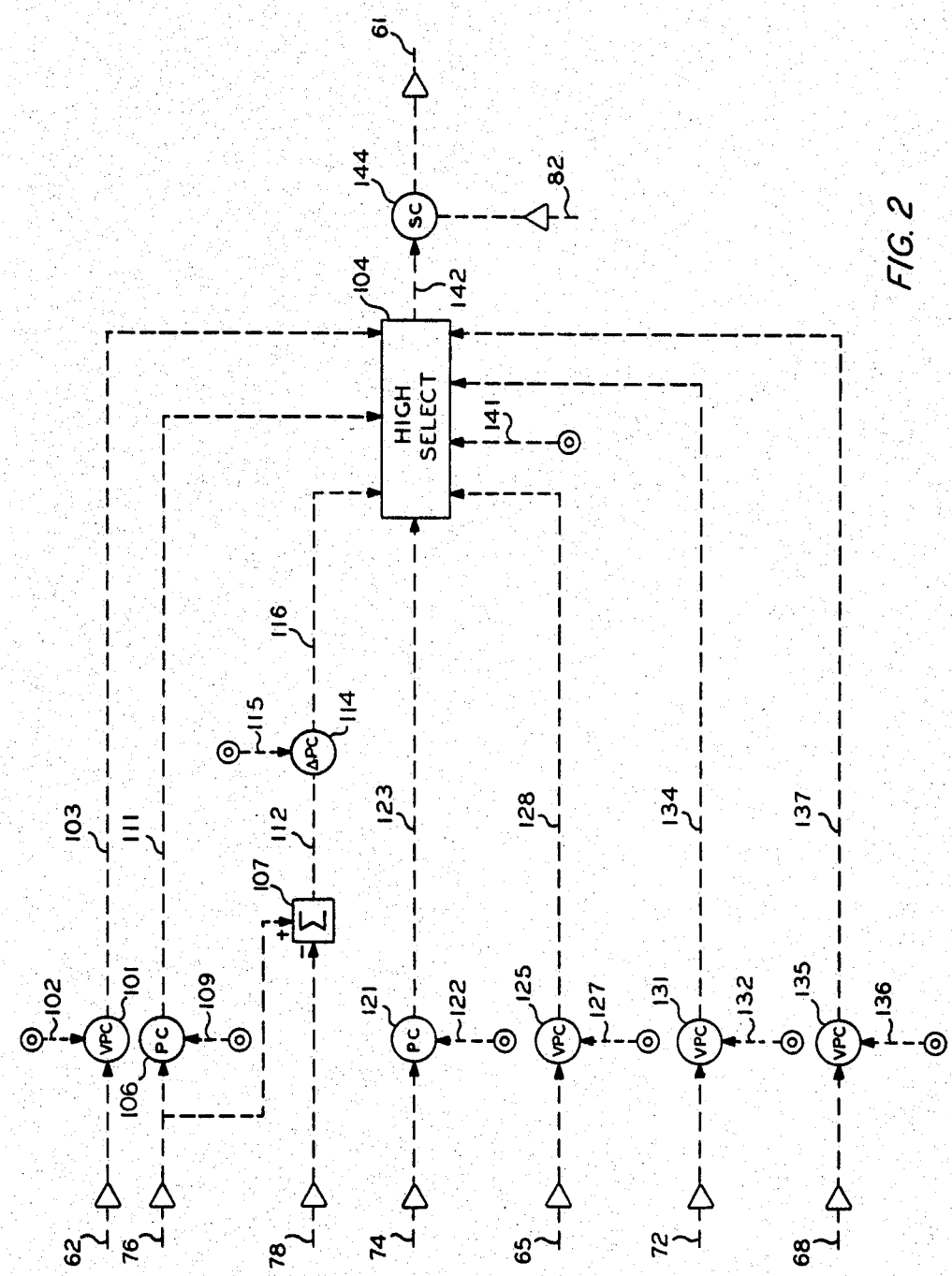

Other objects and advantages of the invention will be apparent from the foregoing brief description of the invention and the claims as well as the detailed description of the drawings in which:

FIG. 1 is a diagrammatic illustration of a fractional distillation process in which a compressor is utilized to supply heat to the fractional distillation process; and FIG. 2 is a diagrammatic illustration of the manner in which the control signal utilized to manipulate the driving force applied to the compressor is generated in response to a plurality of process measurements.

The invention is described in terms of a particular configuration for a fractional distillation process in which a compressor is utilized to supply heat to the fractional distillation column. However, the invention is applicable to other fractional distillation process configurations in which a compressor is utilized to supply heat to the fractional distillation column.

A specific control system configuration is set forth in FIG. 1 for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from some sensors may be pneumatic in form. Transducing of these signals is not illustrated for the sake of simplicity because it is well known in the art that if a process variable is measured in pneumatic form it must be transduced to electrical form if it is to be transmitted in electrical form by a flow transducer.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

The controllers shown may utilize the various modes of control such a proportional, proportional-integral, proportional-derivative, or proportional-integral-derivative. In this preferred embodiment, proportional-integral-derivative controllers are utilized but any controller capable of accepting two input signals and producing a scaled output signal, representative of a comparision of the two input signals, is within the scope of the invention.

The scaling of an output signal by a controller is well known in control system art. Essentially, the output of a controller may be scaled to represent any desired factor or variable. An example of this is where a desired flow rate and an actual flow rate is compared by a controller. The output could be a signal representative of a desired change in the flow rate of some gas necessary to make the desired and actual flows equal. On the other hand, the same output signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more such equipment types. While, the presently preferred embodiment of the invention preferably utilizes a combination of pneumatic final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accomodate signal format requirements for the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to the drawings and in particular to FIG. 1, there is illustrated a fractional distillation column 11 to which a feed stream containing components to be separated is provided through conduit means 12. In the case of a deisobutanizer, the feed stream would typically comprise alkylate, hydrofluoric acid, pentane, isobutane, normal butane, isopentane and heavier components. In the case of a deisopropanizer, the feed stream would typically contain propane and isobutane.

Lighter components in the feed stream flowing through conduit means 12 are removed from the fractional distillation column 11 as an overhead stream through conduit means 14 and are provided to the surge tank 15. Liquid is retained in the surge tank 15 while vapors flow through the combination of conduit means 16 and 17 to the suction inlet of the compressor 18. Power is supplied to the compressor 18 by means of the driver 19 which is operably connected to the compressor 18 by means of the drive shaft 21. The driver 19 would typically be a steam turbine and steam is provided to the driver 19 through conduit means 23.

Compressed fluid is provided from the discharge outlet of the compressor 18 through conduit means 24. A portion of the fluid flowing through conduit means 24 may be recycled to the suction inlet of the compressor 18 through the combination of conduit means 26 and 17 as a means of surge control.

It is generally undesirable to recirculate fluid through conduit means 26 and thus most of the fluid flowing through conduit means 24 will be provided through the combination of conduit means 25 and 27 to the reboiler 28 associated with the fractional distillation column 11 or through the combination of conduit means 25 and 29 to the heat exchanger 31. It is desirable to provide most of the fluid flowing through conduit means 25 to the reboiler 28 rather than the heat exchanger 31 since valuable heat is recovered from the fluid flowing through conduit means 27 but energy is required to cool the fluid flowing to the heat exchanger 31.

After passing through the reboiler 28, the fluid flowing through conduit means 27 is provided through conduit means 32 to the reflux tank 34. The fluid flowing through conduit means 29 passes through the heat exchanger 31 and is provided through conduit means 36 to the reflux tank 34. A cooling fluid is provided to the heat exchanger 31 through conduit means 38.

Fluid is removed from the reflux tank 34 through conduit means 41. A portion of the fluid flowing through conduit means 41 is provided through conduit means 42 as an external reflux for the fractional distillation column 11. The remaining portion of the fluid flowing through conduit means 41 is provided through conduit means 43 to the heat exchanger 44 and is removed from the heat exchanger 44 through conduit means 45 as an overhead product stream. A bottoms product stream is withdrawn from the fractional distillation column 11 through conduit means 46 and is provided to the heat exchanger 44. After passing through the heat exchanger 44, the fluid flowing through conduit means 46 is removed through conduit means 48 as a bottoms product stream.

As is illustrated in FIG. 1, various valves are utilized to manipulate the flow of fluid as required for control of the fractional distillation process. In particular, the flow of fluid through conduit means 27 is manipulated by control valve 51; the flow of fluid through conduit means 42 is manipulated by control valve 52; the flow of fluid through conduit means 23 is manipulated by control valve 53; a flow of fluid through conduit means 26 is manipulated by control valve 54; the flow of fluid through conduit means 36 is manipulated by control valve 55; the flow of fluid through conduit means 45 is manipulated by a control valve 56; and the flow of fluid through conduit means 48 is manipulated by control valve 57. Only signal 61, which is used to manipulate the control valve 53, is illustrated in FIG. 1 since this is the signal which directly controls the speed of the compressor which is the subject matter of the present invention. The signals utilized to manipulate the remaining valves are standard and are generally well known to those skilled in the art of fractional distillation process control. In particular, control valves 51 and 52 would typically be under quality control. Control valves 56 and 57 would typically be under level control, control valve 54 would be controlled as part of the surge control system and control valve 55 would typically be manipulated in response to the temperature in the reflux tank 34. Actual control of these valves has not been illustrated since this control only indirectly affects the speed of the compressor and the quality control and level control utilized are well known to those skilled in the art.

The process measurements utilized to generate the control signal 61 are illustrated in FIG. 1. The manner in which these process measurements are combined to generate the control signal 61 is illustrated in FIG. 2. In particular, the valve position transducer 60 provides an output signal 62 which is representative of the actual position of the control valve 51. In like manner, the valve position transducer 64 provides an output signal 65 which is representative of the actual position of the control valve 52; the valve position transducer 67 provides an output signal 68 which is representative of the actual position of the control valve 54; and the valve position transducer 71 provides an output signal 72 which is representative of the actual position of the control valve 57.

Pressure transducer 73 provides an output signal 74 which is representative of the suction pressure for the compressor 18. In like manner, the pressure transducer 75 provides an output signal 76 which is representative of the discharge pressure of the compressor 18. The pressure transducer 77 provides an output signal 78 which is representative of the pressure in the reflux tank 34. The speed transducer 81 provides an output signal 82 which is representative of the speed of the shaft 21 and is thus representative of the speed of the compressor 18.

As has been previously stated, the manner in which the process measurements illustrated in FIG. 1 are utilized to generate signal 61 is more fully illustrated in FIG. 2. Before beginning a detailed description of FIG. 2 it is noted that, in general, it is desirable to maintain control valves 51, 52 and 57 in a eighty to ninety percent open position to minimize pressure drops across these valves which corresponds to a waste of energy. In contrast, it is desirable to maintain the control valves 54 and 55 in a ten to 20 percent open position since the flow of fluid through these valves also represents a waste of energy. Typically, no valve will be maintained in a fully open or fully closed condition since controllability in one direction is lost if a control valve is in a fully opened or fully closed position.

From the stand-point of energy conservation, the position of the control valve 51 is the most important. As an example of the energy which may be wasted because of the position of the control valve 51, consider a situation in which the quality control manipulating the control valve 51 determines that the bottoms product is too pure indicating that too much heat is being provided to the fractional distillation column 11. If the compressor 18 is running at a constant speed, the only way that the heat input to the fractional distillation column 11 can be decreased is by beginning to close the control valve 51. This will in effect cause more fluid to be by-passed through control valve 55 which is undesirable. The more effective control strategy of the present invention is to decrease the speed of the compressor so as to supply less heat to the fractional distillation column 11 so long as the decrease in the speed of the compressor does not violate some process constraint.

The manner in which this is accomplished is more fully illustrated in FIG. 2.

Referring now to FIG. 2, signal 62, which is representative of the actual position of the control valve 51, is provided as the process variably input to the valve position controller 101. Signal 102, which is representative of the desired position of the control valve 51, is provided as the set point signal to the valve position controller 101. Signal 102 will typically have a value in the range of about 80 to about 90 percent open. In response to signals 62 and 102, the valve position controller 101 provides an output signal 103 which is responsive to the difference between signals 62 and 102 and which is scaled so as to be representative of the speed of the compressor 18 required to maintain the actual position of the control valve 51 substantially equal to the desired position represented by signal 102. Signal 103 is provided from the valve position controller 101 as an input to the high select 104.

Signal 76, which is representative of the actual discharge pressure of the compressor 18, is provided as the process variable input to the pressure controller 106. Signal 76 is also provided to the minuend input of the summing block 107. The pressure controller 106 is also provided with a set point signal 109 which is representative of the minimum allowable discharge pressure. As has been previously stated, the discharge pressure must be such as to insure that required flow rates can be maintained and also insure that product streams can be provided to down stream facilities. In response to signals 76 and 109, the pressure controller 106 provides an output signal 111 which is responsive to the difference between signals 76 and 109 and which is scaled so as to be representative of the speed of the compressor 18 required to maintain the actual discharge pressure substantially equal to the minimum allowable discharge pressure as represented by signal 109. Signal 111 is provided from the pressure controller 106 as an input to the high select 104.

Signal 78, which is representative of the actual pressure in the reflux tank 74, is provided to the subtrahend input of the summming block 107. Signal 112, which is representative of the difference between the magnitude of signal 76 and the magnitude of signal 78, is provided from the summing block 107 as the process variable input to the differential pressure conroller 114. The differential pressure controller 114 is also provided with a set point signal 115 which is representative of the minimum allowable differential pressure. The minimum allowable differential pressure is a second check on insuring that sufficient pressure is maintained in the system to allow required flow rates to be provided throughout the process. In response to signals 112 and 115, the differential pressure controller 114 provides an output signal 116 which is responsive to the difference between signals 112 and 115 and which is scaled so as to be representative of the speed of the compressor 18 required to maintain the actual differential pressure substantially equal to the minimum allowable differential pressure as represented by signal 115. Signal 116 is provided from the differential pressure controller 114 as an input to the high select 104.

Signal 74, which is representative of the actual suction pressure for the compressor 18, is provided as the process variable input to the pressure controller 121. The pressure controller 121 is also provided with a set point signal 122 which is representative of the maximum allowable suction pressure. Typically, a fractional distillation process will be operated as some desired pressure and if this pressure is exceeded to any extent, problems will occur in making the desired separation. Thus, signal 122 will have a value representative of the maximum pressure at which the desired separation can be accomplished. In response to signal 74 and 122, the pressure controller 121 provides an output signal 123 which is responsive to the difference between signals 74 and 122 and which is scaled so as to be representative of the speed of the compressor 18 required to maintain the actual suction pressure for the compressor 18 substantially equal to the maximum allowable suction pressure as represented by signal 122. Signal 123 is provided from the pressure control 121 as an input to the high select 104.

Signal 65, which is representative of the actual position of the control valve 52, is provided as the process variable input to the valve position controller 125. The valve position controller 125 is also provided with a set point signal 127 which is representative of the desired position of the control valve 52. Signal 127 would typically have a value in the range of about 80 to about 90 percent open. In response to signals 65 and 127, the valve position controller 125 provides an output signal 128 which is responsive to the difference between signals 65 and 127 and which is scaled so as to be representative of the speed the compressor 18 required to maintain the actual position of the control valve 52 substantially equal to the desired position as represented by signal 127. Signal 128 is provided from the valve position controller 125 as an input to the high select 104.

Signal 72, which is representative of the actual position of control valve 57, is provided as the process variable input to the valve position controller 131. The valve position controller 131 is also provided with a set point signal 132 which is representative of the desired position of the control valve 57. Signal 132 will typically have a value in the range of about 80 to about 90 percent open. In response to signals 72 and 132, the valve position controller 131 provides an output signal 134 which is responsive to the difference between signals 72 and 132 and which is scaled so as to be representative of the speed of the compressor 18 required to maintain the actual position of the control valve 57 substantially equal to the desired position as represented by signal 132. Signal 134 is provided from the valve position controller 131 as an input to the high select 104.

Signal 68, which is representative of the actual position of the control valve 54, is provided as the process variable input to the valve position controller 135. The valve position controller 135 is also provided with a set point signal 136 which is representative of the desired position of the control valve 54. Typically, signal 136 will have a value in the range of about 10 to about 20 percent open. In response to signals 68 and 136, the valve position contoller 135 provides an output signal 137 which is responsive to the difference between signals 68 and 136 and which is scaled so as to be representative of the speed of the compressor 18 required to prevent surging of the compressor while maintaining the control valve 54 in a desired position as represented by signal 136. Signal 137 is provided from the valve position controller 135 as an input to the high select 104.

The high select 104 is also provided with signal 141 which is representative of the minimum allowable speed for the compressor 18. This minimum allowable speed is typically set by manufacturers operating constraints on the compressor.

In response to the plurality of compressor speed signals, the high select 104 provides an output signal 142 which is representative of the highest speed represented by the plurality of signals provided to the high select 104. Signal 142 is provided from the high select 104 as a set point input to the speed controller 144. The speed controller 144 is also provided with signal 82 which is representative of the actual speed of the compressor 18. In response to signals 142 and 82, the speed controller 144 provides the output control signal 61 which is responsive to the difference between signals 82 and 142. Signal 61 is scaled so as to be representative of the position of the control valve 53 required to maintain a flow rate of steam to the driver 19 which would result in the compressor 18 operating at the speed represented by signal 142.

In summary, the control system of the present invention will insure that the compressor is operated at the minimum speed possible which will both maintain the various control valves at desired positions and insure that an operating constraint is not violated. It is noted that not all of the constraint control illustrated in FIGS. 1 and 2 is required. Typically, control of the position of the control valve 51 is required if energy savings are to be accomplished. Also, the suction pressure and discharge pressure must be controlled since process operability depends upon certain constraints not being violated with respect to the suction pressure and discharge pressure. The remaining constraints can be utilized as desired. Some of the constraints such as the minimum speed for the compressor would very seldom, if ever, be violated and thus the speed protection is not required but does provide a safety factor. Other constraints such as the remaining valve positions are desirable to incorporate but are not required.

The invention has been described in terms of a presently preferred embodiment as illustrated in FIGS. 1 and 2. Specific components which can be used in the practice of the invention as illustrated in FIG. 1 such as valve position transducers 60, 64, 67, and 71; pressure transducers 73, 75 and 77; speed transducer 81; and control valves 51, 52, 53, 54, 55, 56, and 57 are each well known, commercially available control components such as are described at length in Perrys Chemical Engineers Handbook, Fourth Edition, Chapter 22, McGraw Hill. The controllers illustrated in FIG. 2 as well as the summing block 107 and the high select 104 may be implemented using analog components such as are also illustrated and described in length in the Perrys Chemical Engineers Handbook. Also, a digital computer such as the Optrol 7000 manufactured by Applied Automation, Inc., may be utilized to implement the controllers illustrated in FIG. 2, the summing block 107 and the high select 104.

For reasons of brevity, conventional auxiliary equipment such as pumps, additional heat exchangers, additional measurement-control devices, etc. have not been included in the above description as they play no part in the explanation of the invention.

While the invention has been described in terms of the present preferred embodiment, reasonable modifications and variations are possible by those skilled in the art and such modifications and variations are within the scope of the described invention and the appended claims. Variations such as using different constraints are in particular within the scope of the present invention.

That which is claimed is:

1. A method for operating and controlling a fractional distillation process, said method comprising the steps of:

providing a feed stream containing components to be separated to a fractional distillation column;

withdrawing an overhead stream from said fractional distillation column and providing said overhead stream to the suction inlet of a compressor;

providing fluid from the discharge outlet of said compressor through a first control valve to a reboiler associated with said fractional distillation column to thereby supply heat to said fractional distillation column;

establishing a first signal representative of the actual position of said first control valve;

establishing a second signal representative of the desired position of said first control valve;

using computing means to compare said first signal and said second signal and establish a third signal which is responsive to the difference between said first signal and said second signal, wherein said third signal is scaled so as to be representative of the speed of said compressor required to maintain said first signal substantially equal to said second signal;

establishing a fourth signal representative of the actual suction pressure for said compressor;

establishing a fifth signal representative of the maximum allowable suction pressure for said compressor;

using computing means to compare said fourth signal and said fifth signal and establish a sixth signal which is responsive to the difference between said fourth signal and said fifth signal, wherein said sixth signal is scaled so as to be representative of the speed of said compressor required to maintain the magnitude of said fourth signal substantially equal to the magnitude of fifth signal;

establishing a seventh signal representative of the actual discharge pressure for said compressor;

establishing an eighth signal representative of the minimum allowable discharge pressure for said compressor;

using computing means to compare said seventh signal and said eighth signal and establish a ninth signal which is responsive to the difference between said seventh signal and said eighth signal, wherein said ninth signal is scaled so as to be representative of the speed of said compressor required to maintain the magnitude of said seventh signal substantially equal to the magnitude of said eighth signal;

using high select means to establish a tenth signal representative of the highest compressor speed represented by said third, sixth and ninth signals; and controlling the speed of said compressor in response to said tenth signal.

2. A method in accordance with claim 1 additionally comprising the steps of:

providing the fluid, which was provided from the discharge outlet of said compressor to said reboiler, to a reflux tank;

withdrawing fluid from said reflux tank and providing a portion of the thus withdrawn fluid as an external reflux through a second control valve to said fractional distillation column;

establishing an eleventh signal representative of the actual position of said second control valve;

establishing a twelfth signal representative of the desired position of said second control valve; and using computing means to compare said eleventh signal and said twelfth signal and establish a thirteenth signal which is responsive to the difference between said eleventh signal and said twelfth signal, wherein said thirteenth signal is scaled so as to be representative of the speed of said compressor required to maintain the magnitude of said eleventh signal substantially equal to the magnitude of said twelfth signal and wherein said tenth signal is representative of the one of said third, sixth, ninth, and thirteenth signals which is representative of the highest speed of said compressor.

3. A method in accordance with claim 2 additionally comprising the steps of:

withdrawing a bottoms product stream from said fractional distillation column through a third control valve;

establishing a fourteenth signal representative of the actual position of said third control valve;

establishing a fifteenth signal representative of the desired position of said third control valve; and using computing means to compare said fourteenth signal and said fifteenth signal and establish a sixteenth signal which is responsive to the difference between said fourteenth signal and said fifteenth signal, wherein said sixteenth signal is scaled so as to be representative of the speed of said compressor required to maintain the magnitude of said fourteenth signal substantially equal to the magnitude of said fifteenth signal and wherein said tenth signal is representative of the one of said third, sixth, ninth, thirteenth and sixteenth signals which is representative of the highest speed of said compressor.

4. A method in accordance with claim 3 additionally comprising the steps of:

recycling fluid from the discharge outlet of said compressor through a fourth control valve to the suction inlet of said compressor;

establishing a seventeenth signal representative of the actual position of said fourth control valve;

establishing an eighteenth signal representative of the desired position of said fourth control valve; and using computing means to compare said seventeenth signal and said eighteenth signal and establish a nineteenth signal which is responsive to the difference between said seventeenth signal and said eighteenth signal, wherein said nineteenth signal is scaled so as to be representative of the speed of said compressor required to maintain the magnitude of said seventeenth signal substantially equal to the magnitude of said eighteenth signal and wherein said tenth signal is representative of the one of said third, sixth, ninth, thirteenth, sixteenth and nineteenth signals which is representative of the highest speed of said compressor.

5. A method in accordance with claim 4 additionally comprising the steps of:

establishing a twentieth signal representative of the pressure in said reflux tank;

using computing means to establish a twenty-first signal representative of the difference between the magnitude of said seventh signal and the magnitude of said twentieth signal;

establishing a twenty-second signal representative of the minimum allowable difference between the magnitude of said seventh signal and the magnitude of said twentieth signal; and using computing means to compare said twenty-first signal and said twenty-second signal and establish a twenty-third signal which is responsive to the difference between said twenty-first signal and said twenty-second signal, wherein said twenty-third signal is scaled so as to be representative of the speed of said compressor required to maintain the magnitude of twenty-first signal substantially equal to the magnitude of said twenty-second signal, and wherein said tenth signal is representative of the one of said third, sixth, ninth, tenth, sixteenth, nineteenth and twenty-third signals which is representative of the highest speed of said compressor.

6. A method in accordance with claim 5 additionally comprising the step of establishing a twenty-fourth signal representative of the minimum allowable speed of said compressor, wherein said tenth signal is representative of the one of said third, sixth, ninth, thirteenth, sixteenth, nineteenth, twenty-third and twenty-fourth signals which is representative of the highest speed of said compressor.

7. A method in accordance with claim 6 wherein said step of controlling the speed of said compressor in response to said tenth signal comprises:

establishing a twenty-fifth signal representative of the actual speed of said compressor;

using computing means to compare said tenth signal and said twenty-fifth signal and establish a twenty-sixth signal which is responsive to the difference between said tenth signal and said twenty-fifth signal, wherein said twenty-sixth signal is scaled so as to be representative of the driving force which must be applied to said compressor in order to maintain the actual speed of said compressor, as represented by said twenty-fifth signal, substantially equal to the desired speed as represented by said tenth signal; and manipulating the driving force applied to said compressor in response to said twenty-sixth signal.

* * * * *